United States Patent [19]

Vincent

[11] Patent Number: 4,694,650
[45] Date of Patent: Sep. 22, 1987

[54] EXTERNALLY TUNED VIBRATION ABSORBER

[75] Inventor: Ronald J. Vincent, Latham, N.Y.

[73] Assignee: Mechanical Technology Incorporated, Latham, N.Y.

[21] Appl. No.: 889,697

[22] Filed: Jul. 28, 1986

[51] Int. Cl.⁴ .............................................. F02G 1/04
[52] U.S. Cl. ....................................... 60/520; 60/517; 62/6; 188/380
[58] Field of Search ............... 60/517, 520, 525; 62/6; 188/379, 380

[56] References Cited

U.S. PATENT DOCUMENTS

| | | | |
|---|---|---|---|
| 4,380,152 | 4/1983 | Folsom et al. | 60/520 |
| 4,400,941 | 8/1983 | Rauch | 60/520 |
| 4,432,204 | 2/1984 | Walsh | 60/520 |
| 4,450,685 | 5/1984 | Corey | 60/520 |

Primary Examiner—Stephen F. Husar
Attorney, Agent, or Firm—Joseph V. Claeys; Thomas Wall

[57] ABSTRACT

A vibration absorber unit or units are mounted on the exterior housing of a hydraulic drive system of the type that is powered from a pressure wave generated, e.g., by a Stirling engine. The hydraulic drive system employs a piston which is hydraulically driven to oscillate in a direction perpendicular to the axis of the hydraulic drive system. The vibration absorbers each include a spring or other resilient member having one side affixed to the housing and another side to which an absorber mass is affixed. In a preferred embodiment, a pair of vibration absorbers is employed, each absorber being formed of a pair of leaf spring assemblies, between which the absorber mass is suspended.

21 Claims, 16 Drawing Figures

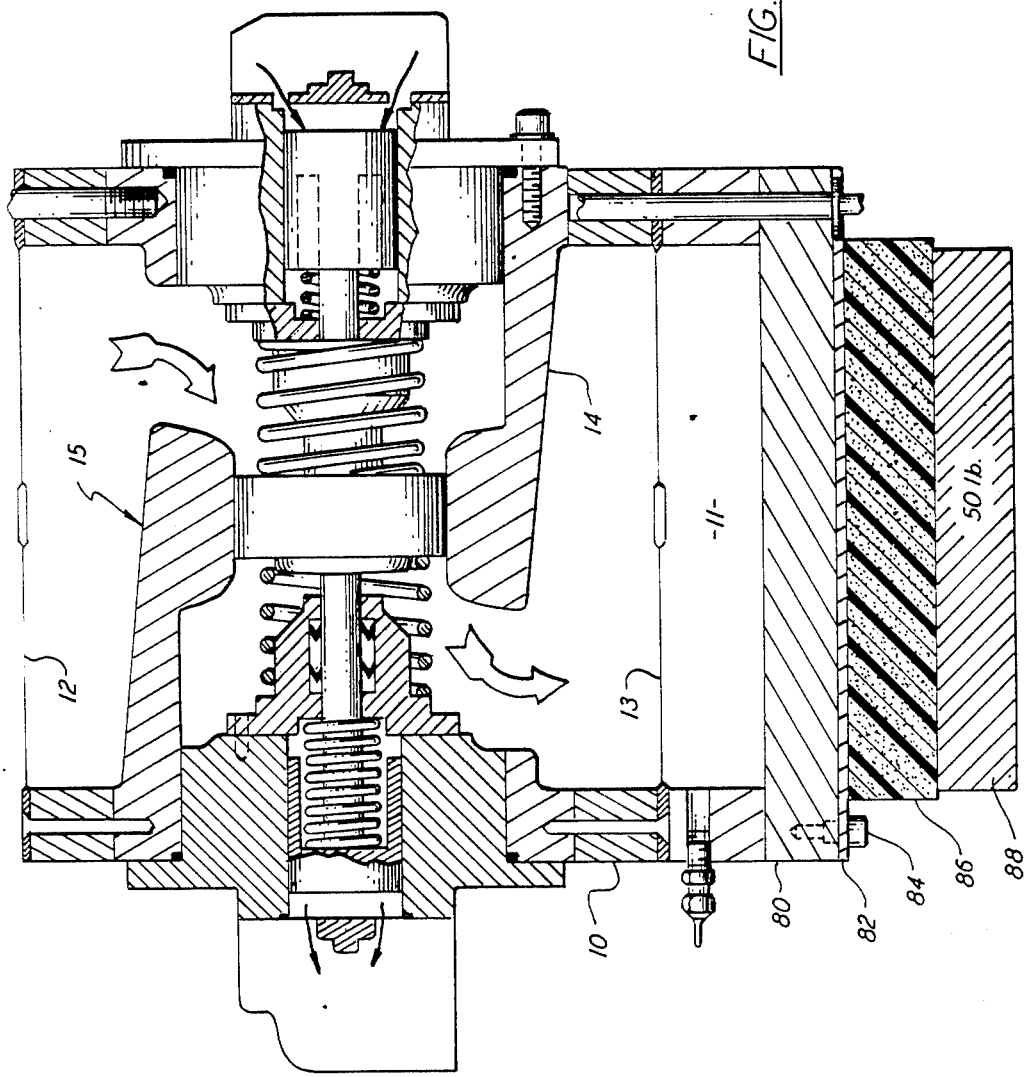

EXTERNALLY TUNED VIBRATION ABSORBER

BACKGROUND OF THE INVENTION

The Government of the United States of America has rights in this invention pursuant to Contract No. 86X-47985V awarded by the U.S. Department of Energy.

This invention relates to an improved system for coupling a Stirling engine to a load, such as a reciprocating compressor, and, in particular to improved apparatus for absorbing vibratory forces acting upon this type of system.

Certain reciprocating prime mover systems, such as the resonsant free piston Stirling engine (RFPSE) system, incorporate a hydraulic drive unit for transmitting power from periodic pressure waves generated by the engine to a movable power element. The hydraulic drive systems can be arranged to drive the movable element in either the same direction as the pressure wave or in a direction at right angles to the pressure wave. In any event, large amplitude shaking forces are generated in the system which lead to early failure of the system. In some cases failure will occur after only one hour of operation.

In U.S. Pat. No. 4,432,204 there is disclosed an improved hydraulic transmission for use in a RFPSE system. The transmission is filled with an incompressible fluid and is adapted to convert periodic engine pressure waves moving along a first axis into a vibratory output acting along a second axis at right angles to the first. The transmission is divided into two sections by a cylinder aligned along the second axis and which contains a movable element or piston that is driven back and forth along a linear path of travel. A pair of diaphragms are situated in the housing which function as a part of a gas spring which reflects the pressure waves toward the piston to cause it to reciprocate within the cylinder. The piston is connected to a load, such as a compressor, whereby the piston output is converted into work.

In a later U.S. Pat. No. 4,450,685, a further improved right-angle type hydraulic transmission is described for coupling a Stirling engine to a load. The transmission contains an internally mounted counterweight which is adapted to offset or balance the transmission induced vibratory forces acting upon the engine. The counterweight encircles the load driving piston and is driven by induced pressure waves within the hydraulic fluid along a linear path of travel that parallels the motion of the piston. The motion of the counterweight is, however, 180 degrees out of phase with that of the piston and the forces developed by the moving weight are directly opposite those developed by the piston. This force balancing system has been found to operate well in practice to diminish the harmful effects of vibration on the system. The internal moving counterweight, however, causes unduly large amounts of heat to be generated in the system thereby lowering the overall efficiency of the transmission. Furthermore, the counterweights are completely enclosed within the transmission housing and cannot be adjusted or resonantly tuned once the housing is closed.

SUMMARY OF THE INVENTION

It is therefore a primary object of the present invention to substantially improve the operating life of reciprocating prime movers having a hydraulic transmission for coupling the prime mover to a load.

Another object of the present invention is to provide externally mounted vibration absorber means for use in association with a hydraulic transmission used to couple a Stirling engine to a reciprocating load.

Yet another object of the present invention is to provide an easily tunable vibration absorber means operatively associated with a hydraulic transmission for coupling a Stirling engine to load so that the resonant frequency of the vibration absorber means can be matched to the operating frequency of the engine and transmission.

These and other objects of the present invention are attained by a hydraulic transmission having a fluid filled housing that is secured to a prime mover and which contains a cylinder that divides the housing into separate volumes and a pair of diaphragms that act as part of a gas spring to convert vibratory energy from the prime mover into fluid pressure waves. A movable element (piston) is mounted for reciprocation in the cylinder and is driven back and forth therein by the pressure waves. A vibratory absorber is mounted on the outside of the housing having a spring upon which an absorber mass is reciprocally suspended so that it moves along a path of travel parallel with the axis of the cylinder so that either the rate of the spring or the weight of the mass, or both, can be easily adjusted to match the frequency of the vibration absorber to that of the system.

BRIEF DESCRIPTION OF THE DRAWING

For a better understanding of these and other objects of this invention, reference is had to the following detailed description of the invention which is to be read in conjunction with the accompanying drawings, wherein:

FIG. 12 is a sectional elevation of a hydraulic drive system according to a second embodiment of the present invention;

DETAILED DESCRIPTION OF THE INVENTION

As described in the previously noted U.S. Pat. Nos. 4,432,204 and 4,450,685, a Stirling engine can be used as a prime mover for driving various loads as a reciprocating refrigeration compressor. A hydraulic transmission unit is used to couple the engine to the load. Pressure waves generated by the engine are induced in the transmission fluid, which is typically an essentially incompressible fluid. Through use of a flexible diaphragm arrangement, the pressure waves induced in fluid are controlled to drive a movable element or piston back and forth along a linear path of travel. The piston, in turn, is operatively connected to a load and is thus caused to do work.

Due to the reciprocal motion of the piston, high amplitude shaking forces are generated in the transmission casing which, if left unattenuated, will become destructive especially to the combustor section of the prime mover where the prime mover is a Stirling engine. As will be pointed out in greater detail below, the present invention utilizes one or more vibration absorbers that are secured to the outside of the transmission casing or housing which serve to reduce the harmful effects of these potentially dangerous vibrations to a safe level. Each absorber contains a mass-spring combination that can be tuned without opening the casing to a desired operating frequency by adjusting the mass weight and/or the rate of the spring.

Before discussing in detail the construction and operation of the present invention, a few words concerning the theory of operation of the system are in order. This theory of operation will be explained in greater detail with reference to FIGS. 1 and 2. It often occurs that vibration in some part of a machine can become excessive at one or more operating speeds. It is often useful to employ means to neutralize or compensate for this vibration or, alternatively, to move the vibrational energy to another member where it can do no harm.

Figure 1:
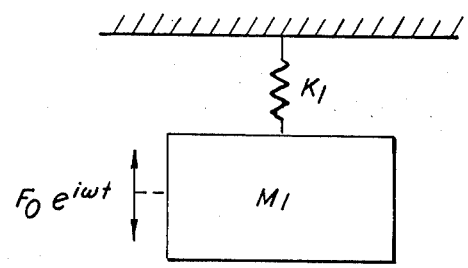
FIGS. 1 and 2 are schematic block diagrams explaining the theory of operation of the present invention.
Figure 2:
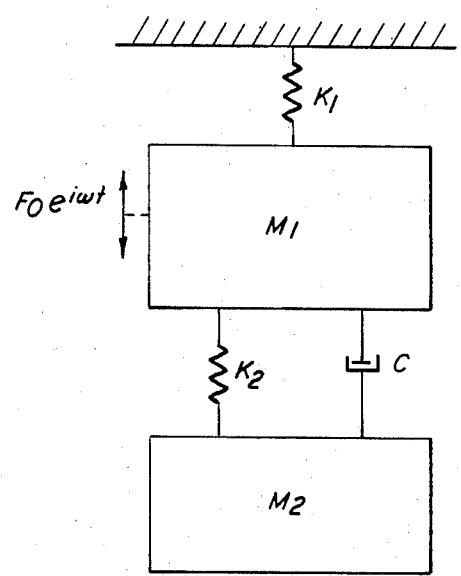

As shown in FIG. 1, a machine or machine part that has been found to vibrate excessively can be considered as a mass m connected by a spring of spring constant $k_1$ to a ground or base. This system will have a natural frequency of $f_1 = 2\pi\sqrt{k_1/m_1}$, and will vibrate excessively when the driving force has about the same frequency. Even when the frequency of the shaking force is much higher than $f_1$, unacceptable vibrations can occur if the magnitude of the force is high or the mass of the machine, $m_1$, is low. Assuming that it is undesirable or impractical to increase the mass $m_1$ or to add damping to the system, improvement in operating performance can only be achieved by adding some element with appropriate dynamic characteristics. One approach, as shown in FIG. 2, is to add a vibration absorber mass to the system, sprung to the main mass with spring constant $k_2$, and an optional damper with a damping factor C. Then, the absorber natural frequency is $f_2 = 2\pi\sqrt{k_2/m_2}$. In the application developed here, the damping, C, is made nearly zero and $f_2$ is selected to be essentially equal to the frequency of the shaking force, $w/2\pi$. The values of mass $m_2$ and spring constant $k_2$ are selected to provide the desired value $f_2$ and to yield spring deflections which will not induce excessive spring stress when the absorber vibrates in response to the applied shaking force. The vibration absorber then imparts a vibrational force to the main mass, $m_1$, which is equal and opposite to the applied shaking force, thereby canceling it.

Figure 3:
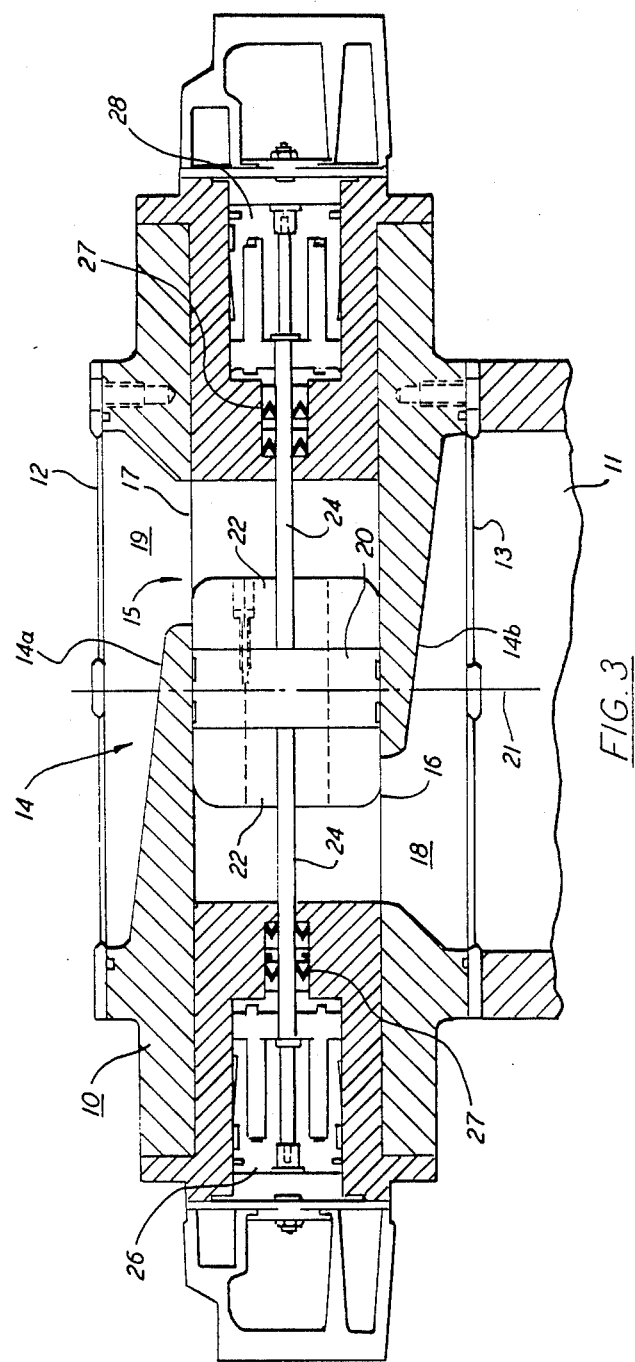
FIGS. 3 and 4 are a side sectional view and a top plan view respectively of a hydraulic drive system according to one embodiment of this invention.
Figure 4:
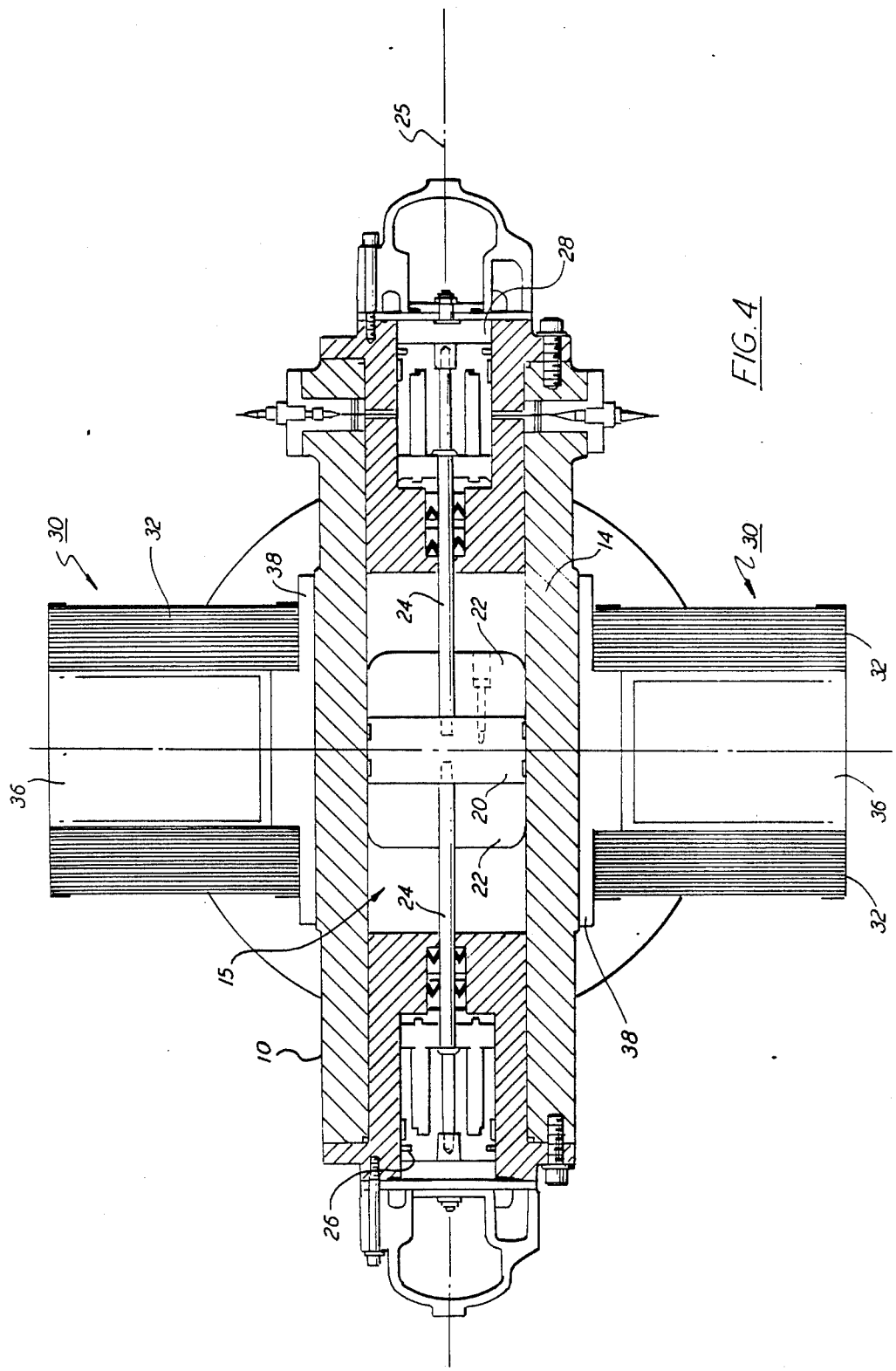
Figure 5:
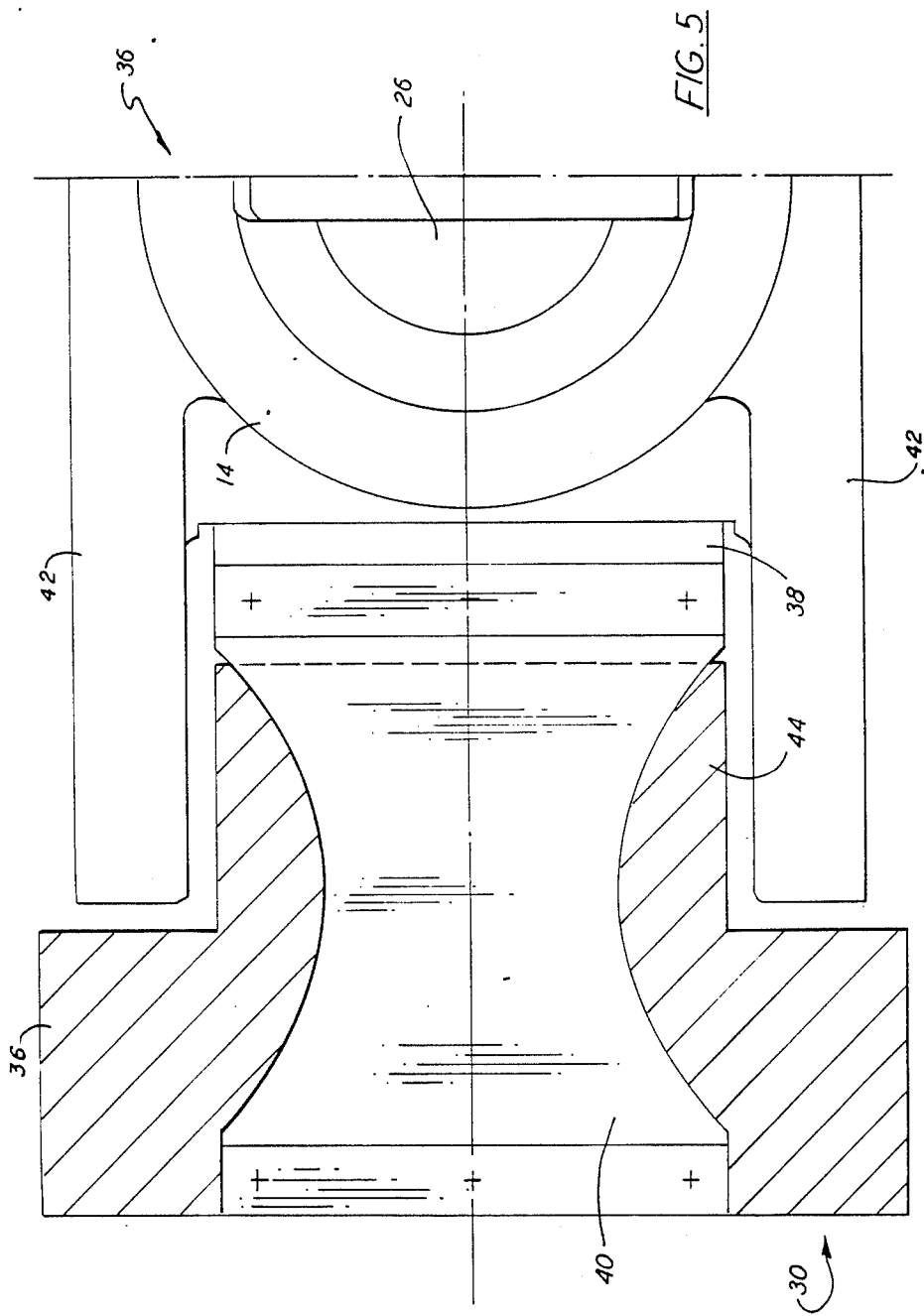
FIG. 5 is an enlarged end view of one of the vibration absorber units shown in FIG. 4.

In the present invention, a vibration absorber having a mass, a spring, and a degree of vibrational freedom in the direction of the cylinder axis, is employed to neutralize vibrations caused by oscillation of the hydraulic piston. The specific mode of operation of the vibration absorber in one embodiment of this invention will be described with specific reference to FIGS. 3-10. FIGS. 3-5 generally illustrate one embodiment of the invention wherein a vibration absorber is coupled to the transmission casing of a resonant free piston Stirling engine (RFSPE) system and the output of the transmission is used to drive a compressor, gas pump, or the like. A Stirling engine of this type suitable for use as a prime mover in this system is described in the above-noted U.S. Pat. No. 4,380,152, and the basic operations of this type of hydraulic drive system is further described in the above-noted U.S. Pat. No. 4,432,204. The disclosures contained in these two patents are herein incorporated by reference to the extent necessary to understand the present invention.

As shown in FIGS. 3 and 4, the hydraulic drive unit comprises a housing 10 having an upper end that is closed by means of a flexible diaphragm 12 which functions as a power coupling diaphragm for receiving energy from a prime mover (Stirling engine) in the form of pressure waves. The housing also contains a lower end that is closed by a second flexible diaphragm 13 which forms part of a gas spring for reflecting the incoming pressure waves toward power piston 20. The housing 10 and the diaphragms 12 and 13 are formed of suitable strong and heat-resistant materials and the housing is further filled with an essentially incompressible fluid, such as a suitable hydraulic oil for conducting the pressure waves and accomodating the volume displacement of the hydraulic piston.

A cylinder asembly 14 is formed within the housing about midway between the upper and lower diaphragms 12 and 13. The housing has a transverse cylinder bore 15 extending with its axis perpendicular to the central axis 21 of the housing. A pair of opposed walls 14a and 14b cooperate to form a cylinder for slidably containing a piston 20 and further serve to divide the interior of the housing into two separate volumes or compartments that include a lower compartment 18 and an upper compartment 19. (FIG. 3) The upper compartment communicates with the cylinder via upper inlet port 17 while the lower compartment similarly communicates with the cylinder via lower inlet port 16. The power piston has respective end faces that are in contact with the hydraulic fluid contained in the housing so that engine generated pressure waves induced in the fluid by the upper diaphragm 12 will cause the power piston to move in one direction. The pressure waves are reflected back by opposing diaphragm 13 that acts in association with gas spring 11 to drive the piston in the opposite direction. The power piston has a pair of optional streamline fairings 22—22 attached to the end faces of the piston which ride inside the cylinder. The piston is conncted to opposed compressor pistons 26 and 28 by means of piston rods 24—24. The rods are slidably contained within suitable seals 27—27 mounted in the compressor casings.

As best illustrated in FIG. 4, a pair of identical vibration absorber units 30—30 are externally mounted upon the housing 10. The units are positioned opposite to each other and are perpendicularly disposed in regard to the central axis 25 of the cylinder 15. As will be explained in greater detail below, the units act in concert to limit the amount of vibratory energy generated by the piston 20 that is translated back to the combustor section of the engine. The present external absorber units have been found to work well in practice to limit combustor vibration levels to less than about 0.5 g's when 2.5 tons of refrigeration are being produced by the compressor.

The vibration absorber assemblies 30—30 each comprise a pair of leaf spring packs 32—32 (FIG. 5) and an absorber mass 36 supported upon mounts 38 that are externally attached to the left and right sides of the housing 10. Each leaf spring pack is formed of a plurality of individual spring leaves 40 which, as shown in FIG. 5, are side cut so as to be arcuate shaped along the top and bottom edges. The absorber mass 36 is situated between overhanging top and bottom circular flanges 42 of the housing 10 so as to occupy the minimum amount of space possible. The absorber mass 36 is principally constituted by a central mass or weight 44, together with side weights 46—46 which are affixed by bolts or the like to the central mass.

Figure 6:
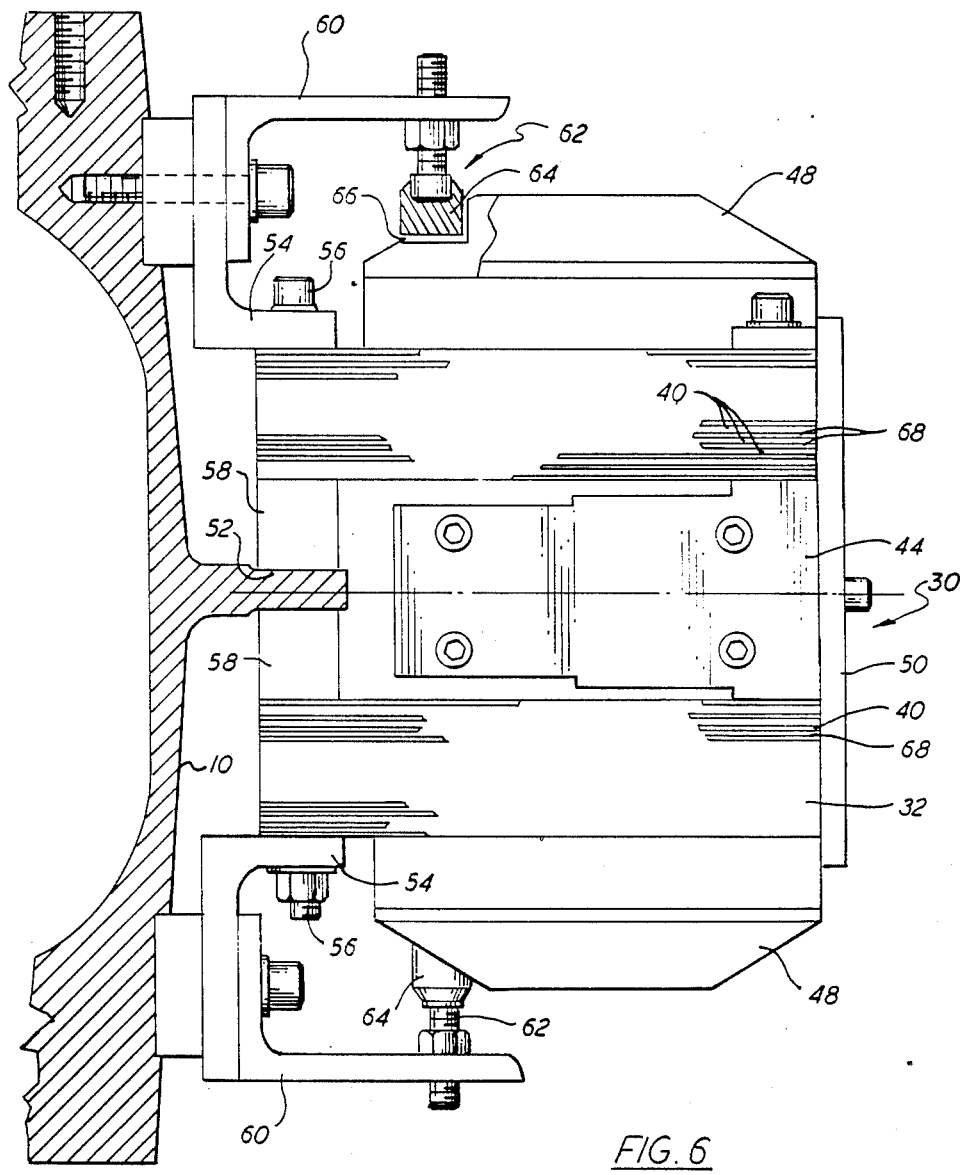
FIGS. 6, 7 and 8 are top plan, side, and end views showing details of a vibration absorber unit similar to that shown in FIG. 5.
Figure 7:
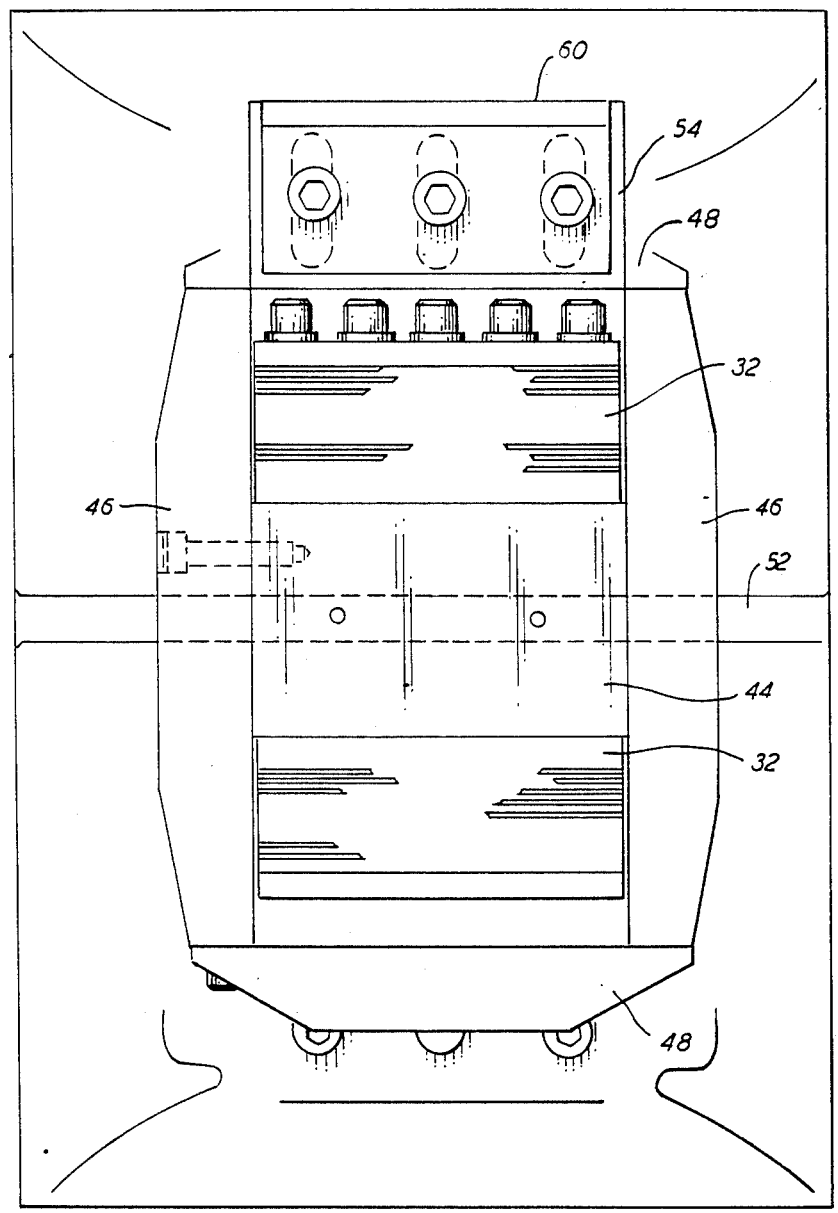
Figure 8:
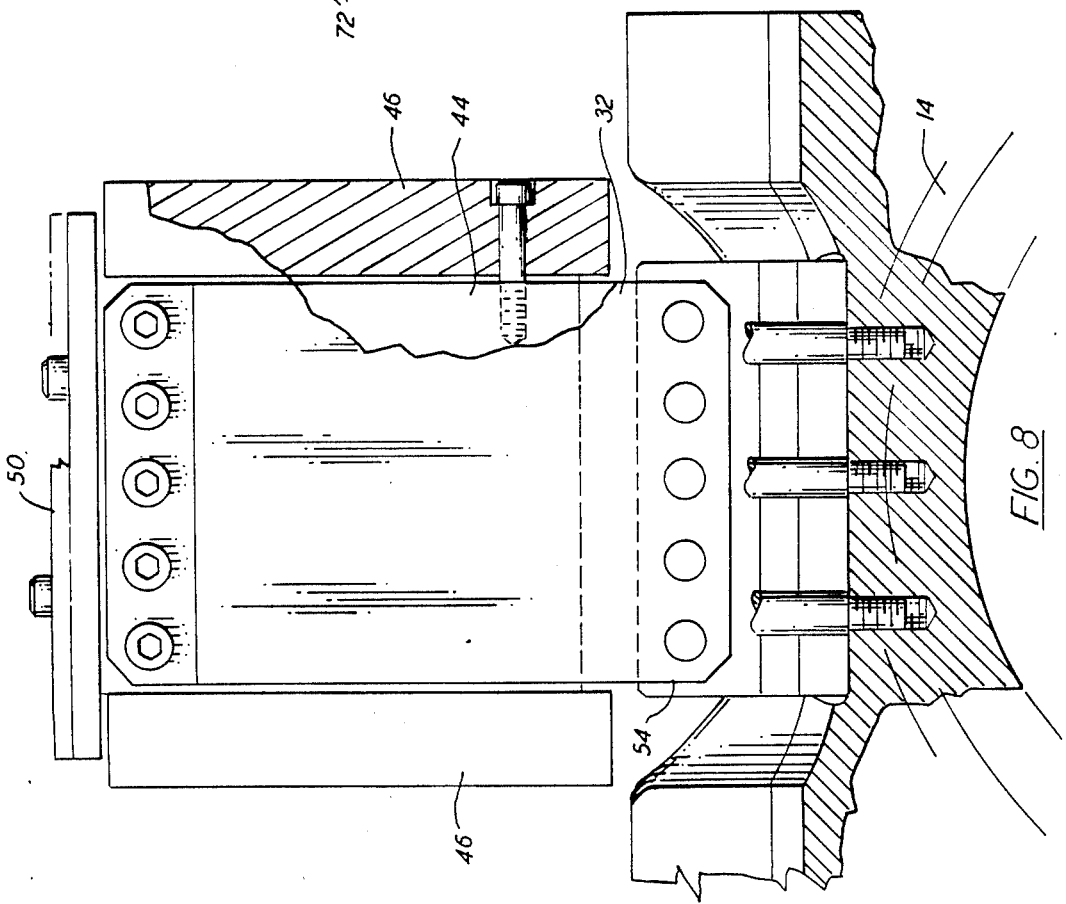

FIGS. 6-8 illustrate another arrangement of absorber assembly 30. The absorber mass 36, is made up of center mass 44, top and bottom weights 46 and end weights 48. End weights 48 are also connected to the assembly outside of the spring packs and tuning mass plates 50—50 are bolted radially outward of the center mass 44. These tuning mass plates are used to add or remove weight to the unit to selectively adjust the resonant frequency of the vibration absorber to a desired level.

The leaf spring packs 32 of each absorber assembly 30 are bolted at one end to a gusset 52 on the housing 10, and to a pair of brackets 54. A set of bolts 56 passes through the brackets, the spring packs, and the gusset with spacers 58—58 being employed to space the inside of each spring pack 32 from the gusset 52. The brackets 54 are designed to reduce the fatigue loading on the gusset 52 thus providing for longer life. On the brackets there are mounted end flanges 60 each of which carries a screw-threaded stroke limiter 62 (FIG. 6). The stroke limiter has a head 64 of rubber or similar material at the end facing absorber unit 30, and a complementary recess 66 is formed in each of the end weights 48 in which the head 64 is movably received to limit the movement of the mass in each direction.

Figure 9:
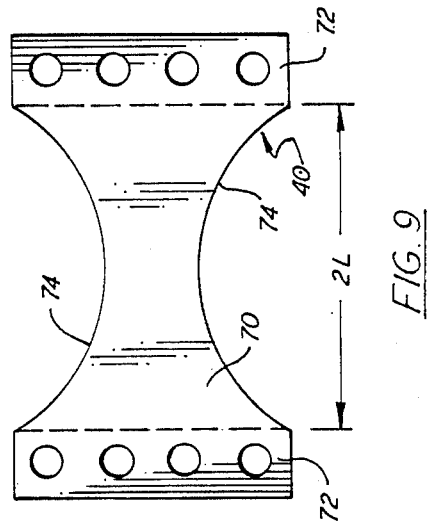

As illustrated in FIG. 6, each of the leaf spring packs 32 contains thirteen individual spring leaves 40, with spacers 68 being interleaved between successive leaves. The spring leaves 40 are made of 0.071 inch thick sheets of 17-7 PH stainless steel or equivalent and the spacers are made from 0.040 inches thick strips of aluminum. In the preferred mode as shown in FIG. 9, the spring leaves 40 each include a spring portion 70 having a width distance 2L of 3.75 inches between end attachment areas 72. The spring body 70 can have arcuate shaped side cuts 74 so that the body 70 is arcuately tapered towards its middle or waist section, which is about one-third the width of the widest body portion, i.e., the portion near the end areas 72. Alternatively, rectangular spring leaves 40' could be employed, as shown in FIG. 10, with straight edged spring areas and end areas 72'.

Figure 10:
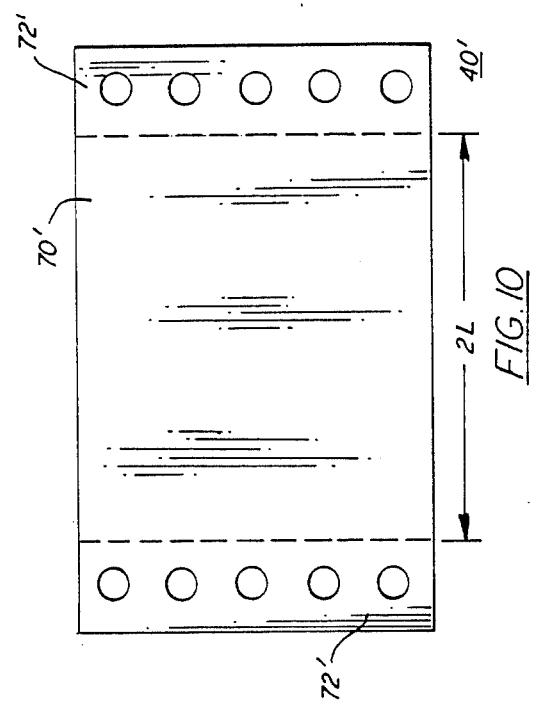
FIGS. 9 and 10 show various spring leaves that are suitable for use in a vibration absorber unit.

Because the leaf spring of FIG. 9 basically functions as a cantilevered beam of tapered width, its deflection is greater than that of the spring leaf 40' of FIG. 10, which has a uniform width. However, bending stress at the clamped edge, that is, at the end areas 72, is the same for both when considering the same load.

Figure 11:
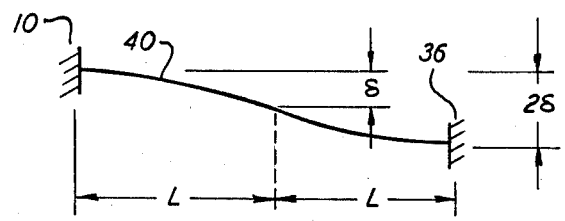
FIG. 11 is a schematic diagram showing the flex characteristic of the spring leaf of FIG. 10.

FIG. 11 shows the bending characteristic of the springs 40 contained in the spring packs 32. As shown, each spring 40 has a line of inflection at the section midway between the point of attachment to the housing 10 and the point of attachment to the absorber mass 36. An equal amount of deflection occurs on either side of the mid-section, and in this embodiment the total design deflection 2δ is about 0.1 inches.

Because the Stirling engine (RFPSE) system with the associated hydraulic drive unit has a design operating frequency of about 60 Hz the absorber mass 36 for each vibration absorber unit 30 is set at about thirty-five pounds, and the total spring constant for both of the spring packs 32 supporting the absorber mass 36 is set at about 12,887 lb/in. It will be seen that these set values give each absorber assembly 30 a natural frequency of about 60 Hz which is equal to the operating frequency of the system. In operation, the vibration absorber assemblies oscillate laterally, and generate directional forces at their attachment points to the housing 10 which are equal and opposite to the inertial force produced by the hydraulic piston 20 and the associated compressor pistons 26 and 28. Without the absorber units, a net shaking force having an amplitude of about 2630 pounds at 60 Hz would be generated when the piston stroke is about 22 millimeters in length. Under such conditions, the housing acceleration is approximately 9.2 g. At 9.2 g's acceleration, unacceptably high forces are produced on the combustor of the Stirling engine which lead to early engine failure which, in some cases, can occur within about one hour of operation. The pair of absorber assemblies 30—30 described hereinabove serve to reduce the amplitude of vibration to about zero when the system is operating at the absorber natural frequency, and to a totally acceptable value of about 0.5 g for frequencies within about 4 Hz of the absorber units natural frequency.

In one specific test, a broadband operating range was achieved (e.g., 54 to 60 Hz) when each absorber assembly 30 was tuned to 57.8 Hz. Lateral acceleration on the combustor was maintained at less than 0.3 g 56 Hz. The absorbers of this invention provided long life, and avoided any frictional sliding with any other parts. It was found that no stability problems were encountered so long as the operating frequency did not rise more than about 1 Hz over the tuned frequency of the absorbers and satisfactory vibration attenuation was achieved for operating frequencies as los as 3 Hz below the tuned frequency of the absorbers.

Another embodiment of this invention is shown in FIG. 12. Here, a plae 80 is disposed beneath the lower diaphragm 13 of the hydraulic drive system. This plate 80 serves to close off a gas cushion beneath the lower diaphragm 13. In this embodiment, a steel backing plate 82 is attached to the plate 80 by means of bolts 84. A rubber-like pad 86 of elastomeric material is bonded to the steel backing plate 82 and supports an absorber mass 88 which is bonded to the pad 86. The pad 86 is of material stiff enough to spring the mass 88, which is for example fifty pounds, at a 60 Hz resonant frequency, and is still able to deflect over an 0.3 inch stroke without degrading itself over time (i.e., at least a 10,000 hour life cycle). Steel or nylon filaments, or other suitable reinforcement can be incorporated within the pad 86. In this embodiment of the invention, the line of action of the absorber mass is not in the same plane as the piston 20 and some unbalanced shaking movement will be unavoidable. This vibration, however, will be within acceptable limits if the system has high rotational inertia.

Figure 13:
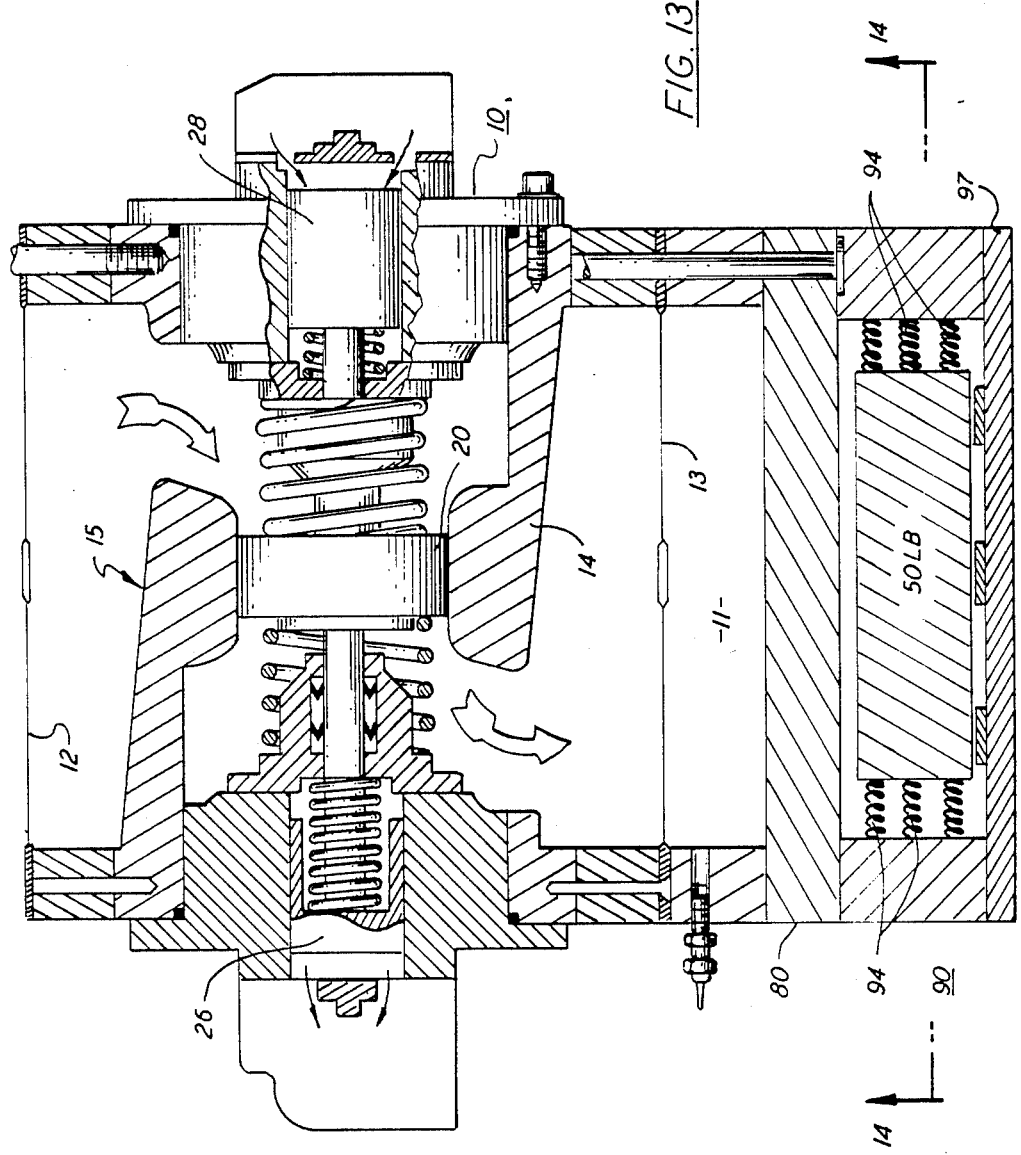
FIG. 13 is a sectional elevation of a hydraulic drive system according to a third embodiment of the present invention.
Figure 14:
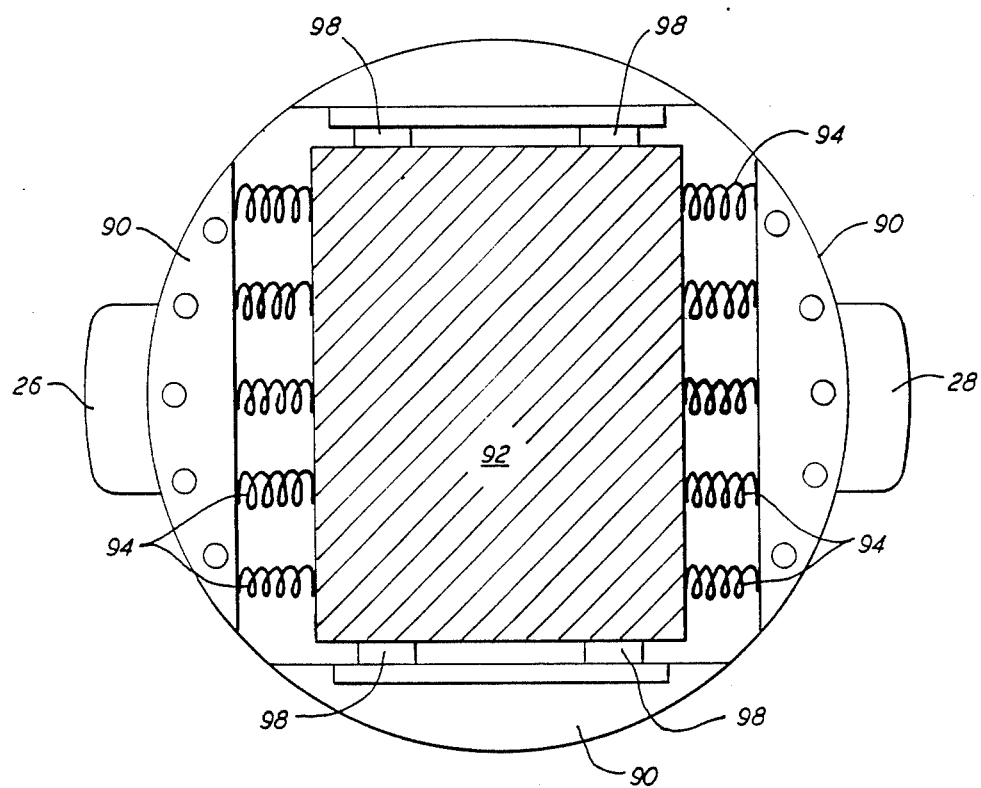
FIG. 14 is a sectional view taken along the line 14—14 of FIG. 13.

As shown in FIGS. 13 and 14, a third embodiment of this invention has an enclosure 90 bolted to the plate 80 situated beneath the housing 10. An absorber mass 92, for example of fifty pounds, is contained within the enclosure 90, and is resiliently restrained therewithin by means of springs 94 extending between the absorber mass 92 and the walls of the enclosure 90. Low-friction supports, of tetrafluoroethylene or the like, support the absorber mass 92 on a lower plate 97 of the enclosure, while low friction guide rails 98, as shown in FIG. 14, guide the mass 92 along a desired reciprocating path of travel so that it oscillates in a single plane parallel to the line of motion of the piston 20.

Although coil springs are shown here for the springs 94, it should be recognized that other resilient means could be employed to equal effect.

Figure 15:
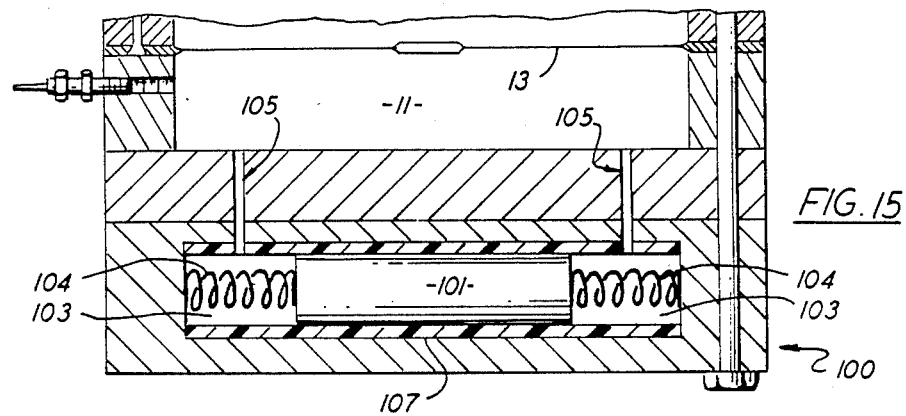
FIG. 15 is a partial view in section of the lower half of a hydraulic drive system according to a further embodiment of the invention.
Figure 16:
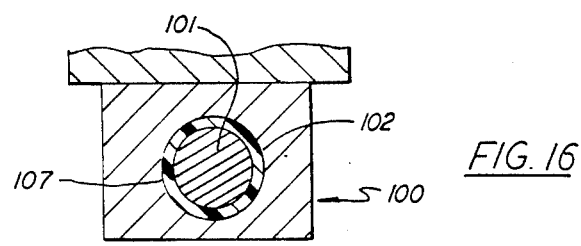
FIG. 16 is a partial end view of the system shown in FIG. 15.

As shown in FIGS. 15 and 16, a fourth embodiment of this invention has a sealed enclosure 100 bolted to the plate 80 situated beneath the housing 10. A cylindrical absorber mass 101, for example of thirty pounds, is contained within the enclosure and translates within a close clearance bore 102 in the enclosure. The absorber mass is resiliently restrained within the bore by means of gas springs 103—103 having high stiffness and by coil springs 104—104 having low stiffness which are used to provide centering of the mass. As an alternative to the coil springs, gas centerports can be provided for the same purpose.

The close clearance around the absorber mass, or additional seals if necessary, prevent significant gas leakage around the OD of the mass when the pressures in the gas springs are not equal. The mean pressures in each gas spring are equal to the mean pressure in the transmission lower gas spring 11 and capillaries 105—105 are provided to allow pressure equalization. As an alternative to the capillaries, one or more gas centerports can be connected to the lower gas spring to provide pressure equalization. The absorber mass translates on low friction materials such as tetrafluorethylene sleeve 107 or the like, or as an alternative, gas bearings can be used to support the absorber mass. The enclosed volume of each gas spring is adjusted to change the spring rate of the gas spring and the weight of the absorber mass is varied by adding or removing tuning weights to the ends of the absorber mass. Thus, the resonant frequency of the mass-spring system is adjusted to match the operating frequency of the compressor drive.

While the present invention has been described hereinabove with reference to specific embodiments, it should be recognized that the invention is not limited to those embodiments, and that many modifications and variations thereof would present themselves to those of skill in the art without departure from the scope and spirit of this invention, as defined in the appended claims.

What is claimed is:

1. In a hydraulic apparatus of the type having a housing filled with a relatively incompressible fluid, said housing being secured to a prime mover and containing diaphragm means for converting vibratory energy transmitted from the prime mover into pressure waves within the fluid for oscillating a movable element along a linear path of motion, the improvement comprising at least one vibratory absorber unit attached to the outside of the housing for absorbing vibrational energy resulting from the oscillation of the movable element that includes a spring means and an absorber mass affixed to the spring means for reciprocal movement parallel with the path of travel of said movable element, and means to adjust the resonant frequency of the absorber means whereby the resonant frequency of the absorber means can be matched to the frequency range of the pressure waves.

2. The improvement of claim 1 wherein said diaphragm means includes a first diaphragm adjacent the prime mover on one side of the movable element and a second diaphragm and a gas spring on the opposite side of the movable element and a pair of absorber units secured on opposite sides of said housing between the two diaphragms.

3. The improvement of claim 1 wherein said diaphragm means includes a first diaphragm adjacent the prime mover on one side of the movable element and a second diaphragm and a gas spring on the opposite side of the movable element and said spring means mounted on said housing beneath the gas spring with the absorber mass being disposed generally on the axis of the housing.

4. The improvement of claim 2 wherein each absorber unit further includes a pair of spaced spring packages each secured to the housing and said absorber mass being suspended between the packages, each package further containing a plurality of spacer strips interleaved between leaf springs with the strips and leaf springs being stacked parallel with the path of motion of said movable element.

5. The improvement of claim 1 wherein said absorber mass is disposed between two gas springs.

6. In a hydraulic drive apparatus of the type having a housing filled with a relatively incompressible fluid, said housing being secured to a Stirling engine and further including a cylinder for separating the housing into two volumes, a first diaphragm in a volume adjacent the engine and a second diaphragm and an operably associated gas spring in said second volume which coact to convert vibratory energy transmitted from the engine into fluid pressure waves for oscillating a movable element along the axis of said cylinder, the improvement comprising a plurality of external vibratory absorber units spaced about the outside of the housing for absorbing vibrational energy generated by the movable means, said absorber units each including a mass suspended between a pair of resilient spring packages which are secured to the housing to permit the mass to reciprocate along a path of travel that is parallel with the axis of said cylinder.

7. The improvement of claim 6 wherein each spring means includes a spring package formed of a plurality of leaf springs that are stacked together in a direction perpendicular with the axis of the cylinder and said absorber mass is suspended between the packages for movement parallel with the said axis.

8. The improvement of claim 7 wherein each spring pack further includes a plurality of spacer strips interleaved between the leaf springs.

9. The improvement of claim 7 wherein each leaf spring has a bottom section secured to the housing, a top section secured to the absorber mass and a mid-section, the top and bottom sections being of the same width and the mid-section being narrower than the top and bottom sections.

10. The improvement of claim 9 wherein the width of the mid-section is substantially one-third the width of the other two sections.

11. The improvement of claim 9 wherein the leaf springs are arcuately tapered between the top and bottom sections.

12. The improvement of claim 6 that further includes weight means removably secured to the absorber mass to selectively adjust the mass of the absorber unit and thus its natural frequency.

13. The improvement of claim 12 wherein the prime mover creates pressure waves of a predetermined frequency in the fluid and the natural frequency of the absorber units is adjusted to about match the predetermined frequency.

14. The improvement of claim 13 wherein said natural frequency is within 4 Hz of the predetermined frequency.

15. The improvement of claim 6 wherein said movable element is connected to load to produce mechanical work.

16. A hydraulic drive for converting vibratory energy to work that includes
   a prime mover for generating vibratory enegy that is attached to a housing filled with a relatively incompressible fluid to form a system,
   said housing being divided into two volumes by a cylinder movably containing a piston,
   means to connect the piston to a load,
   a first diaphragm located in the housing adjacent to the prime mover in one volume,
   a second diaphragm located in the second volume that acts against a first gas spring whereby vibrations transmitted to the housing by the prime mover are converted to pressure waves in the fluid to cause the piston to oscillate in the cylinder along its axis,
   a vibration absorber mounted upon the housing adjacent the first gas spring that contains an absorber mass slidably contained therein that moves along a path of travel that is parellel to the axis of the cylinder, a spring means acting upon the absorber mass so that the resonant frequency of the absorber is matched to the natural frequency of the system.

17. The drive of claim 16 wherein the absorber is centrally positioned upon the axis of the housing that is perpendicular with the axis of the cylinder.

18. The drive of claim 16 wherein the absorber mass is slidably retained in a low friction means.

19. The drive of claim 16 wherein said spring means includes a mechanical spring acting upon each end of the mass facing the direction of movement of said mass.

20. The drive of claim 16 wherein the mass is mounted for movement between two further gas springs.

21. The drive of claim 20 wherein the two further gas springs are in fluid flow communication with said first gas spring.

* * * * *

UNITED STATES PATENT AND TRADEMARK OFFICE
CERTIFICATE OF CORRECTION

PATENT NO. : 4,694,650

DATED : 09/22/87

INVENTOR(S) : Ronald J. Vincent

It is certified that error appears in the above-identified patent and that said Letters Patent are hereby corrected as shown below:

Column 4, line 8, change "operations" to --operation--.

Column 5, line 16, after the word "of" insert --a--.

Column 6, line 42, change "los" to --low--;

line 45, change "plae" to --plate--.

Signed and Sealed this

Twenty-ninth Day of December, 1987

Attest:

DONALD J. QUIGG

Attesting Officer      Commissioner of Patents and Trademarks